US008700408B2

(12) United States Patent
Miyauchi et al.

(10) Patent No.: US 8,700,408 B2
(45) Date of Patent: Apr. 15, 2014

(54) IN-VEHICLE APPARATUS AND INFORMATION DISPLAY SYSTEM

(75) Inventors: Hideo Miyauchi, Obu (JP); Koichi Masuda, Obu (JP)

(73) Assignee: Denso Corporation, Kariya (JP)

( * ) Notice: Subject to any disclaimer, the term of this patent is extended or adjusted under 35 U.S.C. 154(b) by 254 days.

(21) Appl. No.: 13/424,522

(22) Filed: Mar. 20, 2012

(65) Prior Publication Data

US 2012/0245945 A1 Sep. 27, 2012

(30) Foreign Application Priority Data

Mar. 23, 2011 (JP) ................................. 2011-064734
Nov. 8, 2011 (JP) ................................. 2011-244693

(51) Int. Cl.
*G10L 21/00* (2013.01)

(52) U.S. Cl.
USPC .............. 704/275; 704/235; 345/173; 701/36

(58) Field of Classification Search
CPC ........................ G10L 15/06; G10L 2015/228
USPC ...................... 704/235, 275; 345/173; 701/36
See application file for complete search history.

(56) References Cited

U.S. PATENT DOCUMENTS

| 6,427,115 B1 * | 7/2002 | Sekiyama ..................... 701/526 |
| 7,818,125 B2 * | 10/2010 | Hatano et al. ................. 701/455 |
| 2003/0009330 A1 * | 1/2003 | Cho .............................. 704/235 |
| 2003/0156097 A1 * | 8/2003 | Kakihara et al. .............. 345/156 |
| 2009/0248820 A1 * | 10/2009 | Basir et al. .................... 709/206 |
| 2010/0127996 A1 * | 5/2010 | Kitahara et al. .............. 345/173 |
| 2010/0134242 A1 * | 6/2010 | Ohta et al. ...................... 340/5.1 |
| 2010/0204987 A1 | 8/2010 | Miyauchi |
| 2011/0077028 A1 * | 3/2011 | Wilkes et al. ................ 455/456.3 |
| 2013/0190978 A1 * | 7/2013 | Kato et al. ....................... 701/36 |

FOREIGN PATENT DOCUMENTS

| JP | 2002-171580 | 6/2002 |
| JP | 2003-076389 | 3/2003 |
| JP | 2003-244343 | 8/2003 |
| JP | 2010-130223 | 6/2010 |
| JP | 2010-130553 | 6/2010 |
| JP | 2010-185975 | 8/2010 |
| JP | 2011-048076 | 3/2011 |

* cited by examiner

*Primary Examiner* — Vincent P Harper
(74) *Attorney, Agent, or Firm* — Harness, Dickey & Pierce, PLC

(57) ABSTRACT

An in-vehicle apparatus receives an image data representative of a screen image from a portable terminal with a touch panel. The apparatus extracts a text code data from the image data, and identifies a text-code display area in the screen image. The apparatus determines a command text based on a user-uttered voice command. The apparatus identifies a text-code display area as a subject operation area in the screen image of the portable terminal, based on the command text, the text code data extracted from image data, and information on the text-code display area corresponding to the text code data. An area of the screen image of the touch panel corresponding to the text-code display area is identified as the subject operation area, and a signal indicative of the subject operation area identified is transmitted to the portable terminal.

15 Claims, 7 Drawing Sheets

IN-VEHICLE APPARATUS AND INFORMATION DISPLAY SYSTEM

CROSS REFERENCE TO RELATED APPLICATION

The present application is based on and claims the benefit of priority of Japanese Patent Applications No. 2011-64734, filed on Mar. 23, 2011, and No. 2011-244693, filed on Nov. 8, 2011, the disclosure of which are incorporated herein by reference.

TECHNICAL FIELD

The present disclosure generally relates to an in-vehicle apparatus displaying information displayed by a screen of a portable terminal and an information display system including such in-vehicle apparatus.

BACKGROUND

Conventionally, it is well-known that an in-vehicle apparatus may be coupled to a portable terminal, which has a touch panel for receiving user inputs, for displaying a screen image of the portable terminal on a display unit of the in-vehicle apparatus. For example, Japanese Patent Laid-Open No. 2010-130553 (JP '553) discloses an image data for displaying an image on a touch panel screen of a portable terminal is transmitted to a vehicular device, and such image data is processed to be displayed on a touch panel screen of the vehicular device to have substantially the same image on the vehicular device side. Further, the vehicular device in JP '553 transmits a user operation on the vehicular device side touch panel to the portable terminal, after detecting the user operation on the touch panel and converting the vehicular device side touch panel coordinates of the user operation to portable terminal side touch panel coordinates.

Further, it is also known that a user-uttered voice command is voice-recognized and is used to operate a vehicular device based on a voice recognition technique, such as when a driver of a vehicle is operating the vehicle and is not able to manually operate a switch or the like. Such an example is disclosed in Japanese Patent Laid-Open No. 2010-185975 ('975), in which the user-uttered voice command is voice-recognized for operating an audio device in a vehicle.

The invention in the JP '553 is considered as a technique for establishing a cooperative control of the portable terminal and the vehicular device, enabling a relay of touch panel operation information from the portable terminal to the vehicular device, based on the coordinate information of the user operation on the vehicular device side as described above.

However, even if the vehicular device recognizing a voice command is used in the invention in JP '553, such voice command recognized in the vehicular device side cannot be used to operate the portable terminal. More practically, JP '553 only discloses a configuration in which operation coordinates of the touch panel operation on the vehicular device side are converted to operation information for operating the portable terminal, and such operation information is transmitted to the portable terminal. Therefore, the invention in JP '553 is not capable of transmitting the operation information for operating the portable terminal, based on a voice command accepted by the voice recognition, thereby not enabling the user to control the portable terminal based on the voice command accepted on the vehicular device side.

SUMMARY

In view of the above and other problems, the present disclosure provides an in-vehicle apparatus and a system including such apparatus, in which the in-vehicle apparatus uses a voice command recognized by the apparatus for operating a portable terminal when the in-vehicle apparatus displays a screen of a touch-panel-enabled portable terminal that accepts an operation input from a touch panel of the portable terminal.

In an aspect of the present disclosure, an in-vehicle apparatus may receive an image data representative of a screen image from a portable terminal with a touch panel, and the apparatus may display the screen image of the touch panel of the portable terminal based on the image data. The apparatus may include a vehicle communication unit, an extraction unit, a text-code display area identification unit, a voice recognition unit, and a subject operation area set unit.

The vehicle communication unit may receive the image date from the portable terminal. The extraction unit may extract a text code data from the image data received by the vehicle communication unit. The image data includes the text code data that represents at least one of a text and a code in the screen image of the touch panel of the portable terminal. The text-code display area identification unit may identify a text-code display area in the screen image, and the voice recognition unit may recognize a user-uttered voice command and converts the recognized voice command into a command text.

The subject operation area set unit may identify a text-code display area as a subject operation area in the screen image of the portable terminal. Specifically, when the command text is acquired from the voice recognition unit, a determined text code data of the command text is determined based on the command text acquired from the voice recognition unit, the text code data extracted by the extraction unit, and information corresponding to the text code data on the text-code display area. The text-code display area is acquired based on the determined text code data, and an area of the screen image of the touch panel corresponding to the text-code display area acquired by the subject operation area set unit is identified as the subject operation area. The apparatus may then provide a signal indicative of the subject operation area identified by the subject operation area set unit to the portable terminal.

According to the above configuration, the user of in-vehicle apparatus is enabled to operate the touch panel of the portable terminal having a screen image, by simply uttering a voice command that corresponds to one of the text code data to display text in a switch, a button or the like included in the screen image of the portable terminal, such as a "BACK" button, a "CLOSE" button, a code "x" or the like. That is, by displaying the screen image of the portable terminal on a display unit of the in-vehicle apparatus and by associating the user-uttered voice command with the text in the switch or the button on the screen of the portable terminal, the in-vehicle apparatus of the present disclosure enables the user to use his/her voice for controlling the touch-panel-enabled portable terminal, by identifying an intended operation area in the screen image of the portable terminal.

As a result, when the screen of the portable terminal accepting an input from the touch panel is displayed on the in-vehicle apparatus, a manual operation of the portable terminal is enabled based on the voice command accepted by the in-vehicle apparatus.

Further, in addition to the above configuration, an association generation unit may be provided to generate a text-code-and-area association between the text code data and the text-code display area, based on the information of the text code data from the extraction unit and the text-code display area identified by the text-code display area identification unit. As a result, the subject operation area set unit is further configured to identify the text code data corresponding to the command text with reference to the text-code-and-area association and the text-code display area of the identified text code data.

According to the above configuration, the text-code-and-area association is generated based on the extraction of the text code data from the image data of the screen image that is received from the portable terminal and the identification of the text-code display area of the extracted text code data. Therefore, even when a new application program (i.e., an application hereinafter) is added to the portable terminal and a new screen including the text code data for a process of such new application is displayed, a new text-code-and-area association is generated for the display of such new screen. Further, information for operating the portable terminal is generated and transmitted to the portable terminal as a signal that indicates an area of the touch panel of the portable terminal (i.e., the subject operation area), which corresponds to the text-code display area identified with reference to the text-code-and-area association associating the text code data with the command text converted from the voice command. Therefore, there is no need for the in-vehicle apparatus to pre-store an operation command corresponding to the application of the portable terminal. Thus, even when a new application is added to the portable terminal requiring a new screen including the text code data for a process of the new application, such addition or change of the application of the portable terminal is readily accommodated for allowing the operation of the portable terminal by using the voice command received by the in-vehicle apparatus.

Further, in addition to the above configuration, the in-vehicle apparatus includes an in-vehicle touch panel to display the screen image of the portable terminal based on the image data received by the vehicle communication unit. When the in-vehicle touch panel is operated by the user, an operation area of the in-vehicle touch panel is determined in the screen image, and an area of the touch panel of the portable terminal corresponding to the determined operation area of the in-vehicle touch panel is identified as the subject operation area. A signal indicative of the subject operation area is transmitted from the vehicle communication unit to the portable terminal.

Further, in addition to the above configuration, an association storage unit for storing predetermined association between a code and a text indicating the contents of the code is provided for the in-vehicle apparatus, and the association generation unit uses the association stored in the association storage unit as a reference to generate a code dictionary defining for each code the contents of the code, based on the text code data of the text indicating the code contents. In such manner, the user-uttered voice command representing a code (e.g., a sign, a mark, an icon, a geometric figure or the like) is translated into an area including a position of the code, that is, the subject operation area, in the screen image of the portable terminal, and such subject operation area can be transmitted as a signal to the portable terminal. For example, when the association in the code dictionary associates a code "x" with a text "close," the user-uttered voice command "close" leads to a transmission of a signal that indicates the subject operation area corresponding to the code "x."

Further, in addition to the above configuration, the extraction unit extracts the text code data from the image data received by the vehicle communication unit each time the vehicle communication unit receives new image data and the screen image is displayed based on the image data, and the text-code display area identification unit identifies the text-code display area each time the text code data is extracted. Newly-extracted text code data and newly-identified text-code display area are associated to define a new association, and the new association is appended to the existing text-code-and-area association.

Further, in addition to the above configuration, when the voice recognition unit acquires a text, the subject operation area set unit acquires the text code data corresponding to such text, and examines if the text code data is included in the screen image currently being displayed. If the text code data is determined to be included in the screen image, the subject operation area set unit identifies the text-code display area corresponding to such text code data, and further identifies a corresponding area on the screen image of the touch panel of the portable terminal as the subject operation area. If the text code data is not determined to be included in the screen image, a message is provided by a presentation unit to the user, informing that a process indicated by the text code data cannot be performed in the screen image currently being displayed. In such manner, when a process indicated by the voice-command-converted text code data cannot be performed, such situation can easily be recognized by the user.

As described above, when the in-vehicle apparatus presents the message informing that the currently displayed screen is not capable of performing a process indicated by the text code data corresponding to the translated text, the in-vehicle apparatus may further present for the user a notice that prompts the user to switch the currently displayed screen. In such manner, the user may utter a voice command for switching the currently displayed screen upon receiving such notice, thereby being enabled to perform the intended process by the voice command. As a result, the user convenience is improved.

Further, in addition to the above configuration, the subject operation area set unit may identify a subject operation area in the screen image of the touch panel of the portable terminal, by acquiring the text-code display area corresponding to the text code data that is an exact match with the command text recognized by the voice recognition unit and by mapping (i.e., associating) the acquired text-code display area to an area in the screen image of the touch panel of the portable terminal.

Further, in addition to the above configuration, the subject operation area set unit may identify a subject operation area by partially matching of at least one character in the command text with the text code data in the text-code-and-area association to provide a user with a partial match text code data entries from the text-code-and-area association. That is, partial matching of the text code data where at least one or more characters in a voice conversation text recognized by the voice recognition unit (i.e. command text) matches with the text code data in the text-code-and-area association. The subject operation area set unit further identifies a subject operation area in the screen image based on the user's selection of one of the partial match text code data entries via the input unit.

In such manner, the subject operation area corresponding to the user intended text code data is identified even when two or more entries of the text code data having the same sound are stored, or even when the translation of the voice command to the text is at least partially wrong.

Further, in addition to the above configuration, when the screen image is displayed based on the image data that is received by the vehicle communication unit, the text code data included in the text-code-and-area association that is generated by the association generation unit is emphasized in the screen image. That is, for the text-code display area corresponding to the text code data that is included in the text-code-and-area association generated by the association generation unit, the corresponding subject operation area of such text-code display area is identified and a signal indicating such area is transmitted to the portable terminal, for controlling the portable terminal in the same manner according to an input from the touch panel of the portable terminal. In other words, the text code data in the association generated by the association generation unit is the text code data of a process that can be performed on the portable terminal based on the voice command.

Therefore, according to the above-mentioned configuration, a user can easily recognize the text code data regarding a process that can be performed on the portable terminal based on the voice command. Further, the text-code display area that is not extracted as the text code data is not emphasized in the screen image. Such a non-emphasis of the text code data in the screen image is beneficial for determining a cause of non-execution of a voice command, because, in case that the text code data is not emphasized in the screen image, a cause of non-execution of a voice command is attributed not to the microphone or the portable terminal, but to the non-extraction of the text code data from the voice command.

When the text code data of the voice-recognized text corresponding to the text-code display area is not identified by the subject operation area set unit, the text code data in the text-code-and-area association generated by the association generation unit is shown in a list form. The text code data in the text-code-and-area association generated by the association generation unit is, as described above, the text code data of a process that can be performed in the portable terminal based on the voice command. Therefore, according to the above configuration, the text code data of a process that can be performed in the portable terminal is provided for the user in an easily recognizable manner as a list, especially when the operation of the portable terminal based on the voice command is fails, due to, for example, mispronunciation of the voice command, or the like.

Further, in addition to the above configuration, when the screen image includes multiple division areas and a subject text code data exists in more than one of the multiple division areas, the association generation unit generates the text-code-and-area association with a division attribute text added to the association. In such manner, even when the same text code data is included in the multiple division area of the screen image, a position of each of the text code data in the multiple division areas can be identified. Therefore, by uttering the voice command in combination with a text indicative of the intended divisional area having the text code data, the subject operation area having an intended process can be identified.

Further, in addition to the above configuration, the in-vehicle apparatus further include a display unit for displaying the position of text code data provided in the multiple division areas of the screen image of the touch panel of the portable device. The display unit may further receive an input in regards to the text code data in the multiple division areas, and when the text code data corresponding to the command text is provided in more than one of the multiple division areas, the subject operation area set unit determines the text code data according to the input received by the display unit. Therefore, even when the same text code data exists in more than one of the multiple division areas in the screen image, the subject operation area of the intended process is identified based on an input received via the display unit.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
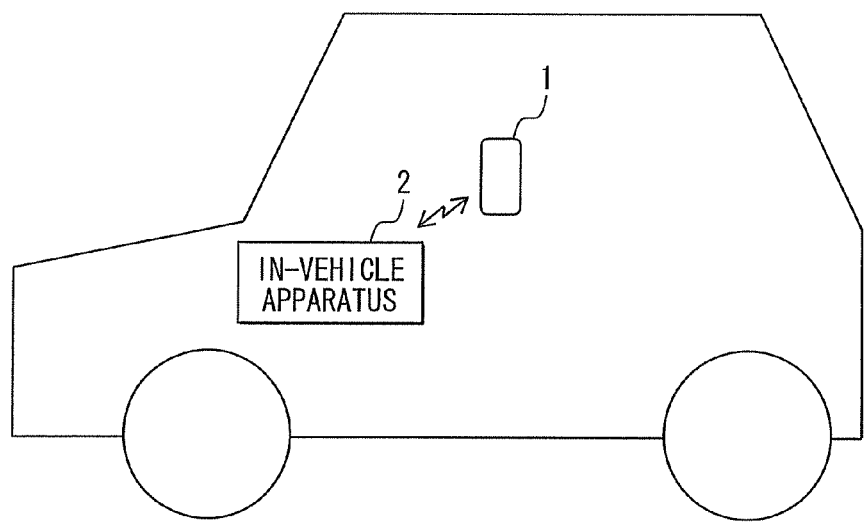
FIG. 1 is a block diagram of an information display system in a first embodiment of the present disclosure.

The present disclosure is described with reference to the drawings in the following. With reference to FIG. 1, an information display system 100 includes a cellular phone 1 and an in-vehicle apparatus 2. In the information display system 100, the cellular phone 1 generates a screen image as an image data for displaying the screen image on a screen of the cellular phone 1, and transmits the image data to the in-vehicle apparatus 2. The image data may be used to generate a screen image that is displayed on a screen of the display device of the in-vehicle apparatus 2, and may be used to prompt or receive an input for operating the cellular phone 1.

The cellular phone 1 may be a touch panel enabled cellular phone that receives an input operation by a touch panel or a "smart phone" in which a user interface may mainly be through the touch panel. The cellular phone 1 may be equipped with a call function, an e-mail function, a music function, a navigation function, and the like. The cellular phone 1 may be referred to as a portable terminal in claims.

Figure 2:
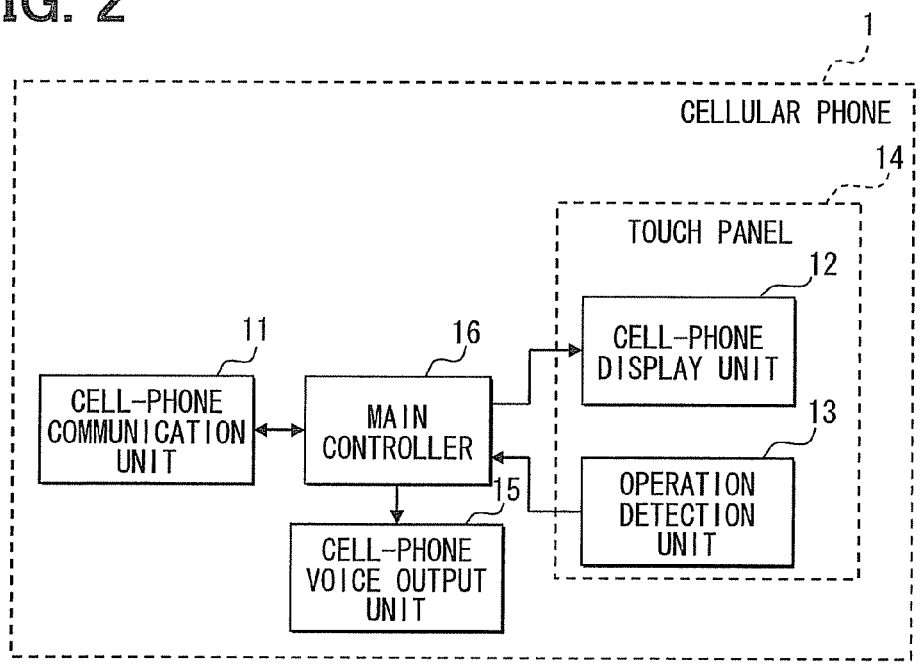
FIG. 2 is a block diagram of a cellular phone of the present disclosure.

With reference to FIG. 2, a configuration of the cellular phone 1 is described. The cellular phone 1 includes a cell-phone communication unit 11; a touch panel 14 having a cell-phone display unit 12 and an operation detection unit 13; a cell-phone voice output unit 15; and a main controller 16.

The cell-phone communication unit 11 communicably couples with the in-vehicle apparatus 2, such as through wireless communication. Wireless communication can be established via Bluetooth (a registered trademark) communication (BT Communication) that is in accordance Bluetooth standard. It should be understood to one skilled in the art that other wireless communication standards may be implemented to communicably couple the cell-phone communication unit 11 and the in-vehicle apparatus 2, such as ZigBee (a registered trademark) or a wireless LAN standard such as IEEE 802.11. Communication between the cellular phone 1 and the in-vehicle apparatus 2 may also be wired communication such as a connection through USB, rather than wireless communication. The cell-phone communication unit 11 may be provided as a terminal side communication unit in claims.

The cell-phone display unit 12 displays screen images according to various application programs of the cellular phone 1. The cell-phone display unit 12 may be implemented as a full color display device made of a liquid crystal display, an organic electroluminescence display, a plasma display, or the like.

The operation detection unit 13 detects, by using a touch switch that is integrally formed with the cell-phone display unit 12, an operation of the touch switch recognizing a touch position on the touch switch and outputting the recognized touch position to the main controller 16. In other words, the operation detection unit 13 detects what position on the screen image displayed on the cell-phone display unit 12 is operated, and inputs the detected position to the main controller 16. The position is, in the present embodiment, information/data such as a coordinate or coordinates on the screen image of the cell-phone display unit 12.

The touch switch may be a capacitance detection, a resistance film, or the like. Further, the position may be an identifier information such as an ID for identifying a division area, if the screen is divided into multiple areas.

The cell-phone display unit 12 and the operation detection unit 13 form the touch panel 14 in a unified manner, and, according to an instruction from the main controller 16, a screen including a button image is displayed on the cell-phone display unit 12 in the touch panel 14. The button image includes a text, a code and the like, which representatively show what kind of function/process is performed when the button is operated. Further, when an operation for the button image is performed, the touch panel 14 detects a position of the button image receiving the operation by using the operation detection unit 13, and inputs the detected position to the main controller 16. The touch panel 14 may be provided as a touch panel of the portable terminal in claims.

The cell-phone sound output unit 15 includes speakers, and, based on instructions from the main controller 16, outputs the voice of a caller, various guidance voices, and the like.

The main controller 16 is implemented as an ordinary computer, and, includes, for example, CPU, ROM, EEPROM, RAM, input/output (I/O) and a bus connecting those components (not shown). The main controller 16 performs various processes, based on information provided from the cell-phone communication unit 11, the touch panel 14, and the like.

For example, the main controller 16 executes an application program (i.e., an application hereinafter), and generates image data to be displayed as a screen image on the touch panel 14 according to the executed application, and displays the generated screen image on the touch panel 14 according to the image data. The application may be pre-stored in ROM, or may be downloaded from a server through network communications by a not-illustrated communication unit.

Further, the main controller 16 determines which one of button images on the screen on the touch panel 14 is operated based on the detected position input to the touch panel 14, and performs a process in accordance with the operated button. For example, when the main controller 16 detects an operation of a button image "Close" for closing a window on the screen image, it performs a window close process. Further, when the main controller 16 detects an operation of a button image "Back" for going back to a previous screen that is displayed before the currently-displayed screen, it performs a screen transition process to go back to the previous screen.

Furthermore, the main controller 16 performs a pairing process so that it communicates with the in-vehicle apparatus 2 through the cell-phone communication unit 11 according to the Bluetooth standard. Then, after establishing BT communication between the cellular phone 1 and the in-vehicle apparatus 2, displays the cell-phone screen on the in-vehicle apparatus 2 and goes to a terminal mode, in which the input operation on the in-vehicle apparatus 2 is used to control/operate the cellular phone 1. According to a user input on the touch panel 14 for selecting such mode, image data generated for displaying the screen image on the touch panel 14 is transmitted to the in-vehicle apparatus 2 by the main controller 16.

The image data described above has, for example, color information of each of pixels that constitute a screen image. Further, when the terminal mode is selected, display area information regarding the cell-phone display unit 12, such as a screen size (=width (W pixels)×height (H pixels)) and a resolution, is transmitted from the cell-phone communication unit 11 to the in-vehicle apparatus 2.

In the terminal mode, the main controller 16 determines which one of the button images on a screen of the touch panel 14 is operated based on the detected position from the in-vehicle apparatus 2 received by the cell-phone communication unit 11, and performs a process according to the operated button. Details of such process are described later in detail.

The in-vehicle apparatus 2 in FIG. 1 may be fixedly installed in a vehicle, or may be temporarily and movably used in a vehicle, and is used to display an image. For example, the in-vehicle apparatus 2 may be a vehicular display device, a vehicular navigation apparatus, or the like. A vehicular navigation apparatus having a display device integrated therein may also be used as the in-vehicle apparatus 2. In the present embodiment, the in-vehicle apparatus 2 is assumed to be a vehicular navigation apparatus having an integrated display device.

Figure 3:
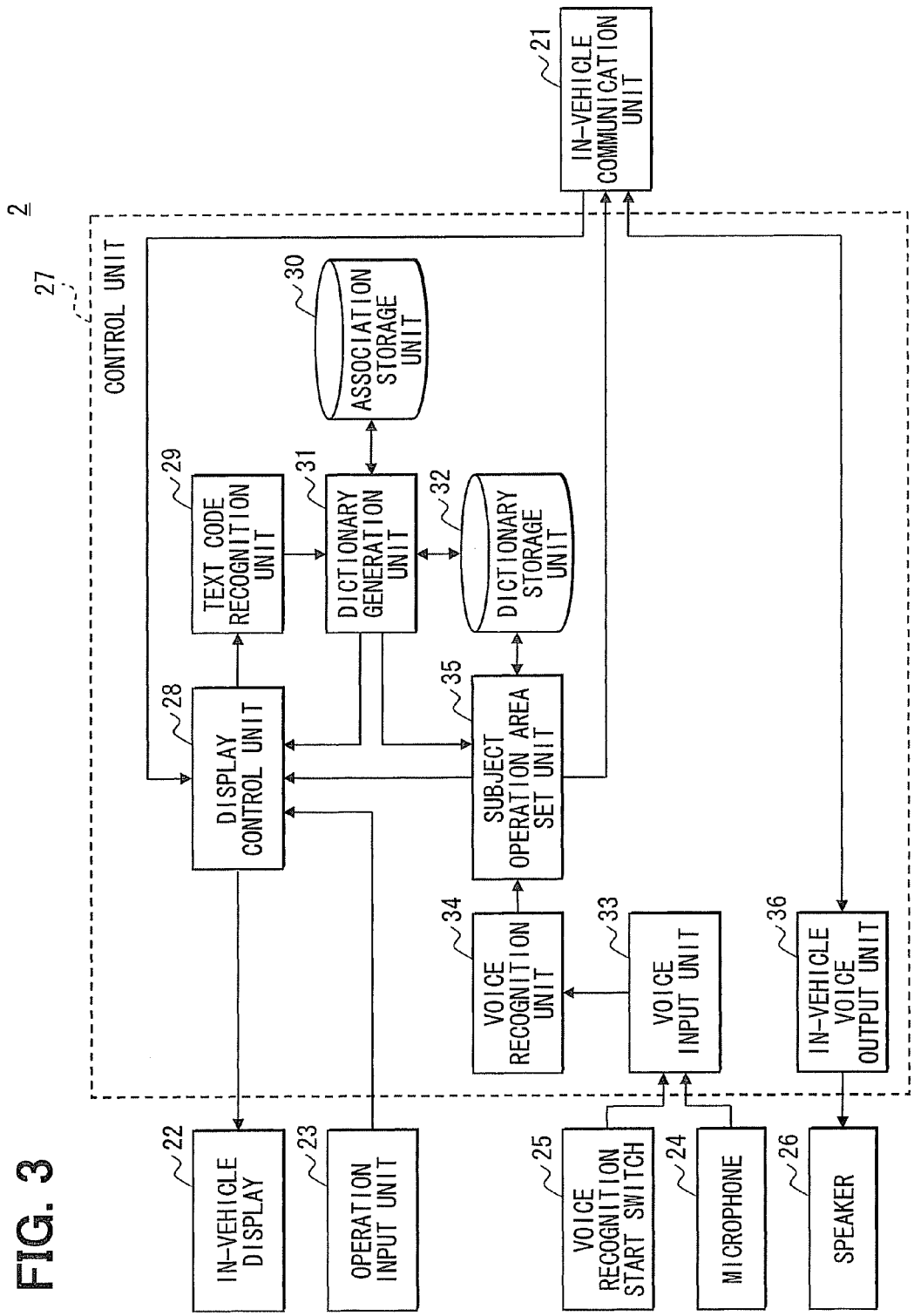
FIG. 3 is a block diagram of an in-vehicle apparatus of the present disclosure.

With reference to FIG. 3, a schematic configuration of the in-vehicle apparatus 2 is described. The in-vehicle apparatus 2 includes an in-vehicle communication unit 21, an in-vehicle display 22, an operation input unit 23, a microphone 24, a voice recognition start switch 25, a speaker 26 and a control unit 27, as shown in FIG. 3.

The in-vehicle communication unit 21 performs BT communication with the cellular phone 1. The in-vehicle communication unit 21 may be referred to as a vehicle communication unit in claims. The in-vehicle communication unit 21 receives display area information and image data transmitted from the cell-phone communication unit 11, and inputs the information/data to the control unit 27. Further, the in-vehicle communication unit 21 transmits detected position from the control unit 27 to the cell-phone communication unit 11 according to instructions from the control unit 27.

An example of communication establishment procedure may be that ACC-ON (i.e., a turning on of an accessory switch) triggers a query signal from the in-vehicle apparatus 2 to cellular phone through a wired/wireless channel, with or without a response, and, upon having a response from a cellular phone 1, a connection request signal is sent out to the responding cellular phone 1 to have a confirmation therefrom, for completing the communication establishment procedure. If there are two or more cellular phones 1, only one of cellular phone 1 is connected, according to a pre-established priority. The pre-established priority may be a user-registered priority, a signal intensity, a remaining battery amount and the like.

After communication is established between the in-vehicle apparatus 2 and the cellular phone 1, the cellular phone 1 transmits an image signal to the in-vehicle apparatus 2 upon receiving a request of image signal transmission from the in-vehicle apparatus 2.

The in-vehicle display 22 displays a screen according to instructions from the control unit 27. The display 22 may be implemented as a full color display device made of a liquid crystal display, an organic electroluminescence display, a plasma display, or the like.

The operation input unit 23 sends operation instructions to the control unit 27 according to a switch operation. Further, the operation input unit 23 may be implemented partially as a touch switch formed integrally in one body with the in-vehicle display 22 and partially as a mechanical switch disposed on a steering wheel. The operation input unit 23 may be a touch switch or a mechanical switch integrally formed with the in-vehicle display 22, a remote switch, or the like.

In the present embodiment, the operation input unit 23 is formed with the in-vehicle display 22 as a touch switch (i.e., a touch panel), and is disposed as a mechanical switch on a steering wheel (i.e., as a steering switch). Therefore, the in-vehicle display 22 and the operation input unit 23 may be regarded as an in-vehicle touch panel in claims. In addition, any portion of the operation input unit 23 designated as a touch switch, detects the position of the screen image displayed on the in-vehicle display 22 that receives an operation, and inputs the detected position to the control unit 27, similarly to the operation detection unit 13.

The microphone 24 is a small vehicular microphone, and outputs a voice command that is uttered by a user as an electrical signal (i.e., an analog sound signal).

The voice recognition start switch 25 may be a push button switch disposed on a steering wheel, and, when the switch 25 is pushed down by a user, the voice recognition start switch 25 outputs an utterance start signal indicating that a user starts the utterance of the voice command to the control unit 27.

The control unit 27 is implemented as a normal computer, and, for example, includes CPU, ROM, EEPROM, RAM, input/output (I/O) and a bus connecting those components (not shown). The control unit 27 includes a display control unit 28, a text code recognition unit 29, an association storage unit 30, a dictionary generation unit 31, a dictionary storage unit 32, a voice input unit 33, a voice recognition unit 34, a subject operation area set unit 35 and an in-vehicle voice output unit 36, as shown in FIG. 3. Further, the control unit 27 performs various processes based on various information input from the in-vehicle communication unit 21, the operation input unit 23, the microphone 24, and/or the voice recognition start switch 25.

The control unit 27 generates an image based on image data when it receives such image data from the cellular phone 1 through the in-vehicle communication unit 21 by using the display control unit 28, and outputs such image to the in-vehicle display 22 to display an image on the in-vehicle display 22. The image data from the cellular phone 1 is designated as a cell-phone origin image data, and the image generated in the in-vehicle apparatus 2 is designated as an in-vehicle generated image in the following. The display control unit 28 may generate the in-vehicle generated image having a suitable resolution and image size for the screen of the display control unit 28 based on the display area information transmitted from the cellular phone 1.

Further, in the present embodiment, the above-described adjustment of the resolution and the image size based on the display area information from the cellular phone 1 may be changed in the following manner. That is, for example, the above adjustment may be performed based on a fixed value pre-stored in the display control unit 28, without receiving the display area information from the cellular phone 1.

When voice data transmitted from the cellular phone 1 is accepted through the in-vehicle communication unit 21 by the control unit 27, the control unit 27 controls the in-vehicle voice output unit 36 according to the voice data to output voice from the speaker 26.

Further, the control unit 27 performs a dictionary generation process based on the in-vehicle generated image generated by the display control unit 28. With reference to a flowchart in FIG. 4, the dictionary generation process by the control unit 27 is explained. The process of the flowchart starts with reception of the input of the cell-phone origin image data, upon having generated the in-vehicle generated image by the display control unit 28.

The process, in step S1, performs a text code data extraction process. In the text code data extraction process, the text code recognition unit 29 extracts a text and a code (i.e., text code data hereinafter) included in the in-vehicle generated image, based on the in-vehicle generated image generated by the display control unit 28. Therefore, the text code recognition unit 29 is equivalent to an extraction unit in claims.

The extraction of text code data may be perform according by a well-known character recognition technology to extract a text and a code from a PDF file based on Optical Character Recognition (OCR). When extracting a text, a series of characters having an interval under a certain threshold may be recognized as a character string. The text to be extracted depends upon the language used in the system 100. For example, if the language of the system 100 is Japanese, the text extracted may be kana character or a kanji character. Or, if the language of the system 100 is English, the text extracted may be English/Latin alphabet.

Further, the text code data extraction process identifies an area of the extracted text code data in the screen image, which is generated as the in-vehicle generated image after extracting such data. The area of the text code data is designated as a display area in the following. Therefore, the text code recognition unit 29 is equivalent to a text-code display area identification unit in claims. That is, for example, a coordinate of the in-vehicle generated image regarding the extracted text code data may be identified as the display area. Further, when a screen of the in-vehicle display 22 is divided into multiple areas and each of those areas has an ID, such an ID may be used as an identifier of the display area of the extracted text code data in the in-vehicle generated image.

After the text code data extraction process of S1, the process continues to step S2, where the dictionary generation process is performed. In the dictionary generation process, the dictionary generation unit 31 creates a dictionary in which the extracted text code data from S1 and its display area are associated. Therefore, the dictionary is equivalent to the text/code-and-area association in claims. In addition, when a code is extracted in step S1, based on the extracted code, the dictionary generation unit 31 refers to an association between the code and the text in the association storage unit 30, where the text may indicate the meaning of the code, and acquires such text from the association storage unit 30. Then, the text, instead of the extracted code, is associated with the display area of the extracted code in the dictionary. The dictionary generation unit 31 is equivalent to an association generation unit in claims.

Further, the association stored in the association storage unit 30 may be a one-to-two/multiple correspondence between the code and two or more texts, accommodating two or more names of a certain code. In other words, the association does not have to be a one-to-one correspondence between the code and the text.

The association storage unit 30 stores association (i.e., correspondence) between, for example, a code "x" and a text "Close" indicating a meaning of the code "x" defining association between the code and the text, that is, a name of the code, in many cases. The association storage unit 30 is equivalent to an association storage unit in claims.

Further, in the present embodiment, when a button is provided in multiple areas of a screen, in order to enable distinction of the same button in each of multiple division areas in one screen of the in-vehicle generated image where multiple applications (i.e., functions) are executed, the same button in those multiple division areas (i.e., application division areas) may be associated with the text code data of such button (i.e., code) supplemented by a text (i.e., a keyword) indicating respective applications. Such keyword is equivalent to "a division attribute text" in the claims.

Figure 6A:
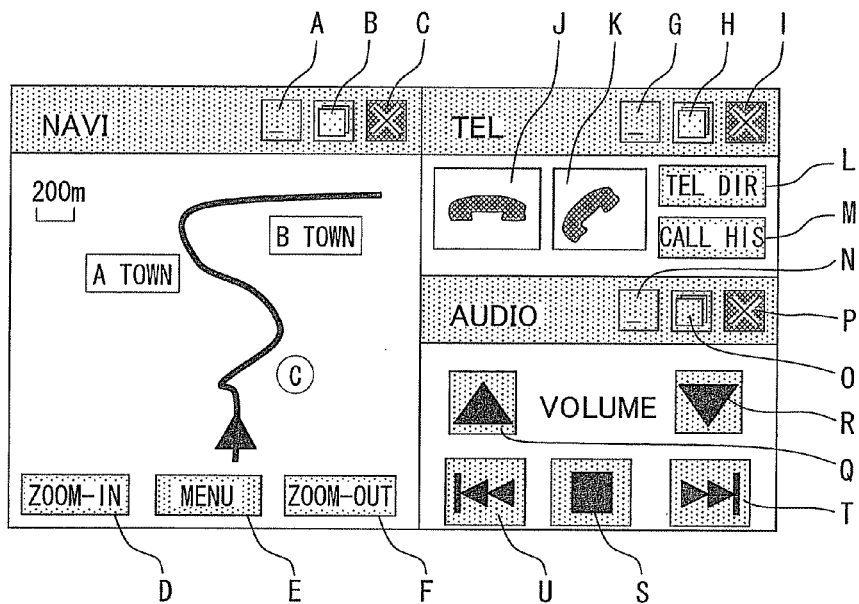
FIG. 6A is an illustration of multiple application division areas of an in-vehicle generation image of the present disclosure.

With reference to an illustration in FIG. 6A, a situation regarding multiple application areas having the same button is explained. The screen in FIG. 6A displays a "navi" area for an operation of a navigation function, a "tel" area for an operation of a telephone function, and an "audio" area for an operation of an audio function.

Further, buttons A to U respectively represent buttons of various processes. Specifically, a button A is for navi area minimization, a button B is for navi area maximization, a button C is for navi area closing. A button D is for map zoom-in (i.e., enlarge), a button E is for menu display, a button F is for map zoom-out (i.e., scale down). A button G is for tel area minimization, a button H is for tel area maximization, a button I is for tel area closing. A button J is for hang-up a call, a button K is for making a call, a button L is for a telephone directory display, a button M is for a call history display. A button N is for audio area minimization, a button O is audio area maximization, a button P is for audio area closing. A button Q is for volume increase (i.e., volume up), a button R is for volume decrease (i.e., volume down), a button S is for stop playback, a button T is for fast forward (i.e., track up), and a button U is for rewind (i.e., track back). The minimization of the application division area is a temporary hiding of the subject division area from the screen, and the maximization of the application division area is an expansion of the subject division area to an entire screen.

As shown in FIG. 6A, buttons A, G, N are buttons to minimize the application division areas; buttons B, H, O are buttons to maximize the application division areas; and buttons C, I, P are buttons to close the application division areas. Therefore, for the distinction of each of those buttons, a keyword indicating each application is added to the text code data, the dictionary having respectively different data for those buttons is generated. For example, in case that buttons A, G, N (i.e., a code showing a button) are associated with a text "minimization" in the association storage unit 30, the buttons A, G, N are evenly interpreted to the same text "minimization" as the text code data.

Addition of an application specific keyword to the text code data is described. First, text code data to have a keyword is picked up by the text code data extraction process, as multiple pieces of the same text code data extracted from one screen image of the in-vehicle generated image. Alternatively, a button used in many applications may be registered in a list of the text code data stored in a memory of the control unit 27, for distinguishing keyword required text code data.

Then, picked-up text code data is combined with the application specific keyword. The keyword for a navigation function may be "navi," and the keyword for a telephone function may be "tel" and "phone," and the keyword for an audio function may be "audio," which may be stored in the memory of the control unit 27, for the addition of the keyword.

The keyword may also be based on text recognition of the text in each of the application division areas, such as "navi" from a text NAVI in the navigation division area, "tel" from a text TEL in the telephone division area, "audio" from a text AUDIO from the audio division area, and the like. In addition, a keyword list may be stored in the memory of the control unit 27 for recognizing only usable keywords from the recognized keyword text.

Further, the association between the text code data and the keyword is established according to the display area of the text code data, that is, according to which one of the application division areas has the subject text code data being displayed. For example, the text code data "close" being positioned in the navigation division area is associated with the text "navi." Similarly, the text code data "close" being positioned in the telephone division area is associated with the text "tel" and the text "phone."

Then, by adding the keyword to the text code data, the dictionary is generated. For example, by adding the keyword "navi" from the navigation division area to the text code data "close," the text code data "close navi" is generated as an entry of the dictionary, and by adding the keyword "tel" and the keyword "phone" from the telephone division area to the text code data "close," the text code data "close tel" and "close phone" are generated as entries of the dictionary.

Figure 6B:
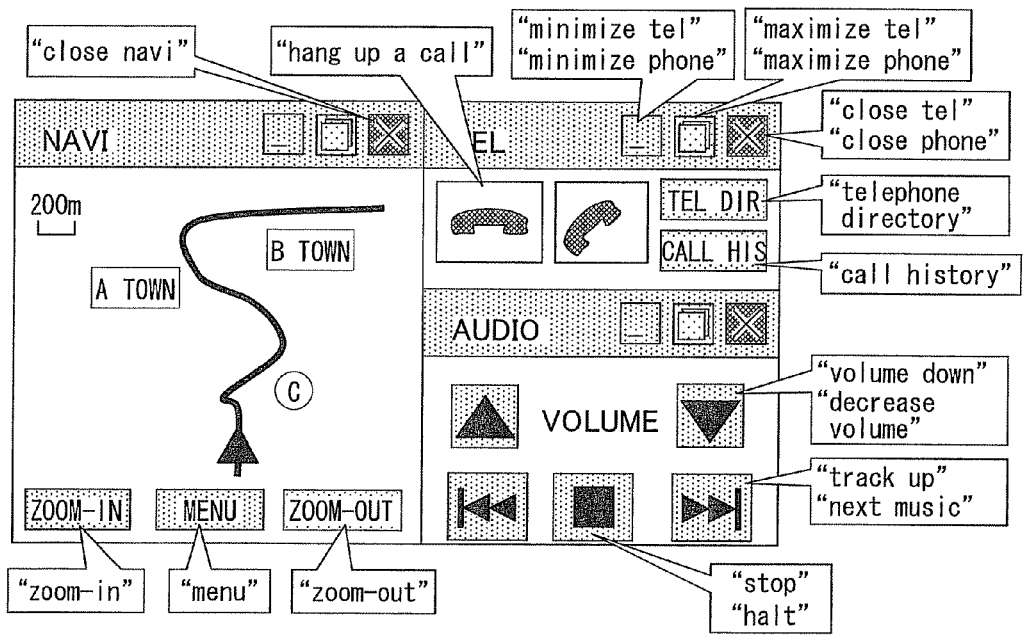
FIG. 6B is an illustration of text code data used in a dictionary generation process of the present disclosure.

With reference to an illustration in FIG. 6B, text code data to be used in the dictionary generation process for making the dictionary is explained. The illustrated screen in FIG. 6B is the same one as the screen in FIG. 6A, having the same buttons displayed therein.

As shown in FIG. 6B, the text code data for a close button of the navigation division area is "close navi," and the text code data for a close button of the telephone division area are "close tel" and "close phone." The text code data for a close button of the audio division area is "close audio," though not illustrated. Further, the text code data for a zoom-in button of the map division area is "zoom-in," the text code data for a zoom-out button of a map is "zoom-out," and the text code data for a menu button is "menu."

Further, as shown in FIG. 6B, the text code data is "minimize tel" and "minimize phone" for the minimization button of the telephone division area, and the text code data is "maximize tel" and "maximize phone" for the maximization button of the telephone division area. Though not illustrated, the text code data is "minimize navi" for the minimization button of the navigation division area, and the text code data is "maximize navi" for the maximization button of the navigation division area. Further, the text code data is "minimize audio" for the minimization button of the audio division area, and the text code data is "maximize audio" for the maximization button of the audio division area.

Further, as shown in FIG. 6B, the text code data is "hang-up a call" for the hang-up button, the text code data is "telephone directory" for the display of the telephone directory, the text code data is "call history" for the display of the call history. Though not illustrated, the text code data is "making a call" for the call button.

Further, as shown in FIG. 6B, the text code data is "volume down" for the volume-down button, the text code data is "stop" for the stop playback button, the text code data is "track up" and "next music" for the next track button. Though not illustrated, the text code data is "volume up" for the volume-up button, and the text code data is "track back" and "previous music" for the previous track button.

Further, the application division area may be a window for each application, or may be a divisional area divided in one screen (i.e., one window). Further, the division of the screen image may not only be performed by the applications, but may also be performed by other criteria.

Figure 4:
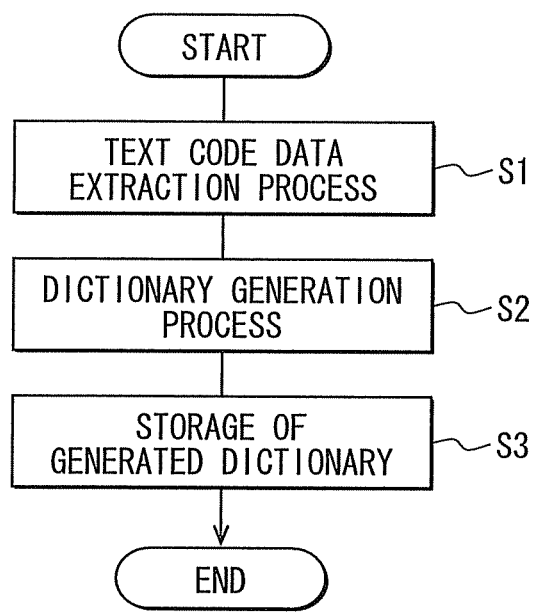
FIG. 4 is a flowchart of a dictionary generation process in a control unit of the present disclosure.

With continuing reference to FIG. 4, the process, in step S3, stores the dictionary made in step S2 by the dictionary generation unit 31 to the dictionary storage unit 32, and the process is completed. In this case, when the dictionary is already stored in the dictionary storage unit 32 in step S2, the existing dictionary is updated to make a new dictionary. For example, when the existing dictionary does not have the association between the text code data extracted in step S1 and the display area, such association may be added to the existing association to make a new dictionary. Further, if the association between the text code data extracted in step S1 and the display area is included in the existing dictionary, the existing dictionary may not be updated, or the existing may be overwritten.

The touch panel and the steering switch may, for example, be switched in terms of restricting input. That is, the control unit 27 may, for example, only receive the user input from the steering switch from among input devices of the operation input unit 23, thereby disabling the touch panel input, when the vehicle is traveling. Further, when the vehicle is not traveling, the control unit 27 may enable the user input from both the touch panel and the steering switch of the operation input unit 23. Whether the vehicle is traveling or not may be determined by detecting the vehicle speed, using a speed sensor, or the like. That is, when the detected vehicle speed from the speed sensor is substantially equal to zero (e.g., under 5 km/h), the vehicle may be determined not to be traveling.

When the input from the touch panel is enabled, an input of the position information, regarding which position of the screen image displayed on the in-vehicle display 22 the operation is performed, is provided from the operation input unit 23, and a position coordinate of the screen image of the touch panel 14 of the cellular phone 1 (i.e. the cell-phone display unit 12) corresponding to the position information is identified as a subject operation area. The subject operation area corresponding to the position information may be identified by reversing the size conversion process of the cell-phone origin image data for generating the in-vehicle generated image.

By transmitting a signal showing the coordinate identified as the subject operation area from the in-vehicle communication unit 21 to the cellular phone 1, the cellular phone 1 has the same input as the input directly performed on the touch panel 14, that is, corresponding to the operation on the identified subject operation area.

Further, the control unit 27 is capable of controlling the cellular phone 1 through the user-uttered voice command even when the touch panel input is disabled. Such control of the cellular phone 1 by the control unit 27 according to the voice command, that is, a voice operation process, is described with reference to a flowchart in FIG. 5 in the following. The process of the flowchart starts at a time of generating the in-vehicle generated image by the display control unit 28 after receiving an input of the cell-phone origin image data while the touch panel input is disabled.

In step S11, the process performs the dictionary generation process based on the in-vehicle generated image generated by the display control unit 28, and the process proceeds to step S12.

In step S12, the process performs a voice-operable subject display process to control the display control unit 28, such as to perform a color emphasis processing (i.e., image processing) for adding a color on the button that corresponds to the text code data extracted by the dictionary generation process, for the purpose of emphasizing buttons and the like. After such image processing, the in-vehicle generated image having an emphasis is displayed as the screen image on the in-vehicle display 22.

Figure 7:
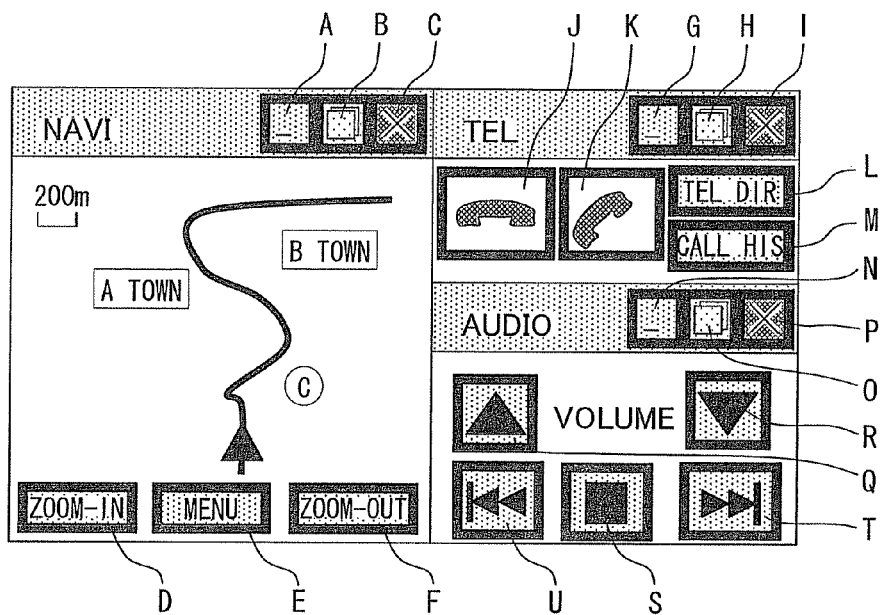
FIG. 7 is an illustration of emphasis in the in-vehicle generation image on the screen of the present disclosure.

The illustration in FIG. 7 shows an example of such emphasis. In FIG. 7, emphasis is added to each of the buttons A to U in the navigation division area, the telephone division area, and the audio division area. The emphasis is shown as a thick line around those buttons A to U in FIG. 7. That is, the buttons A to U are "framed", and the emphasis (i.e., frames) may be colored.

In step S13, the voice input unit 33 determines whether the voice recognition start switch 25 is turned on (i.e., whether, in other words, a voice recognition is started). Such determination may be based on an input of an utterance start signal from the voice recognition start switch 25 to the voice input unit 33. If the voice recognition is initiated (S13:YES), the process proceeds to step S14. If the voice recognition is not initiated (S13:NO), step S13 is repeated till voice recognition is started.

In step S14, the process performs a voice input process, where the voice input unit 33 accepts an analog voice signal that is provided by the microphone 24 for a certain period of time after having an input of the utterance start signal from the voice recognition start switch 25. The accepted analog voice signal may be converted to a digital voice signal by an AD converter, for example, and the voice input unit 33 inputs such signal to the voice recognition unit 34.

Further, in the present embodiment, the above configuration converts an analog voice signal output from the microphone 24 to a digital voice signal by the voice input unit 33. However, such configuration may be changed to other configurations. For example, if a digital microphone is used as the microphone 24, the analog voice signal may be converted to the digital voice signal by the digital microphone 24.

In step S15, the process performs a voice recognition process to extract quantitative voice characteristics from the digital voice signal provided by the voice input unit 33, and quantitative data is generated based on such extraction of characteristics. A method of generating the quantitative data based on the extraction of quantitative characteristics from voice signals is, for example, performed according to a well-known method such as an LPC analyses or the like. Then, based on such quantitative data, the process performs the voice recognition by using a voice recognition dictionary, and converts the digital voice signal into text. Therefore, the voice recognition unit 34 is equivalent to a voice recognition unit in claims. The voice recognition may be performed by using a well-known method, such as a Hidden Markov model, or the like. As a voice recognition dictionary, the dictionary data in the dictionary storage unit 32 may be employed.

In step S16, the process performs an agreement determination process. Based on the text provided by voice recognition process (i.e., a voice conversion text hereinafter), the agreement determination process refers to the dictionary storage unit 32. Then, the subject operation area set unit 35 determines whether there is any text code data, which is included in the stored association of the dictionary storage unit 32, entirely in agreement with a voice conversion text in terms of arrangement of characters (i.e., matching of the voice conversion text with the text code data).

In step S17, if agreeing text code data is found in the process (S17: YES), the text code data having the arrangement of characters entirely agreeing with the voice conversion text is determined as the voice conversion text, and, the process proceeds to step S19. If no agreeing data is found (S17:NO), the process proceeds to step S18.

In step S18, the process performs a list display process to have the subject operation area set unit 35 acquire, from the dictionary storage unit 32, information of the text code data included in the association in the dictionary made by the dictionary generation unit 31, and transmits the information the display control unit 28. Then, the display control unit 28 generates a list of the text code data included in the association defined in the dictionary, based on the information received from the subject operation area set unit 35, and such list is displayed on the in-vehicle display 22. The display control unit 28 may be referred provided as a list unit in claims. After the list display process, the process returns to step S13 for repeating a process from a start of the flowchart.

Figure 8:
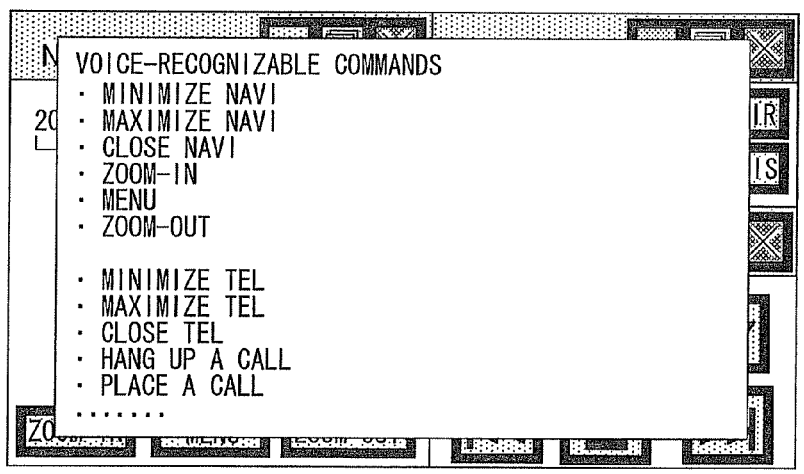
FIG. 8 is an illustration of a list display in the in-vehicle generation image on the screen of the present disclosure.

With reference to FIG. 8, an example of the list display regarding the in-vehicle generated image is described. In FIG. 8, the list display of voice-recognizable command for the screen shown in FIG. 7. In this case, the associations stored in the dictionary are assumed to have all the text code data of the buttons A to U shown in FIG. 7. Further, the text code data of the buttons A to U, which are used in the dictionary generation process to generate the dictionary, are the data described with reference to FIG. 6B.

In the list display process, the text code data included in the associations defined in the dictionary made by the dictionary generation unit 31 (i.e., the voice-recognizable command) is shown as a list on the in-vehicle display 22, as shown in FIG. 8. For example, regarding the buttons A to F in the navigation division area "minimize navi," "maximize navi," "close navi," "zoom-in," "menu," and "zoom-out" are displayed in the list, as shown in FIG. 8, and regarding the buttons G to K in the telephone division area, "minimize tel," "maximize tel," "close telephone," "hang-up a call," "make a call" and the like are displayed.

In step S19, the subject operation area set unit 35 determines whether the currently-displayed screen includes the text code data corresponding to the voice conversion text. Such determination may be based on the examination whether or not the text code data extracted in step S1 includes the text code data corresponding to the voice conversion text.

If it is determined that the currently-displayed screen includes the text code data (S20:YES), the process proceeds to step S22. If the screen does not includes the text code data (S20:NO), the process proceeds to step S21.

In step S21, the process performs a confirmation display process, before returning to step S13 to repeat the process according to the flowchart. In the confirmation display process, the display control unit 28 controls the in-vehicle display 22 to display: (a) a message that notifies the user that a process indicated by the text code data corresponding to the voice-recognized text cannot be performed while the currently-displayed screen is kept unchanged, and (b) a message prompting the user to switch the currently-displayed screen. Therefore, the display control unit 28 is equivalent to a presentation unit in claims.

The above-described situation is more practically explained. For example, when the extracted text in step S1 is the text code data "CD" and the currently-displayed screen does not have a button "CD" for the playback of a Compact Disk (i.e., CD), a text message "CD button currently not displayed." and a text message "Use menu button to open a menu screen" may be displayed at the same time.

The above-described message display (i.e., "no-button" message and "screen-switch" message) may be changed to different processes. For example, only the "no-button" message may be displayed.

Further, the above-described text messages may be vocally provided as a voice message. That is, (a) a message that notifies the user that a process indicated by the text code data corresponding to the voice-recognized text cannot be performed while the currently-displayed screen is kept unchanged, and (b) a message prompting the user to switch the currently-displayed screen, may be vocally provided as voice guidance from the speaker 26 under control of the in-vehicle voice output unit 36.

In step S22, the process performs a subject operation area identification process. In the subject operation area identification process, the subject operation area set unit 35 refers to the dictionary stored in the dictionary storage unit 32, and acquires the display area (i.e., an on-screen text position) corresponding to the text code data corresponding to the voice-recognized text. Then, the acquired display area is interpreted to the subject operation area on the screen of the touch panel 14 on the cellular phone 1. That is, an area on the cell-phone touch panel 14 corresponding to the acquired display area is identified as the subject operation area. Therefore, the subject operation area set unit 35 is equivalent to a subject operation area set unit in claims. The subject operation area corresponding to the acquired display area may be identified by reversing the size conversion process of the cell-phone origin image data for generating the in-vehicle generated image.

Further, if the text code data in the same application division area is associated with two or more different display areas in the dictionary and the subject operation area identification process identifies two or more display areas corresponding to such text code data, the display area associated with the text code data extracted by the most recent text code data extraction process may be used.

Figure 5:
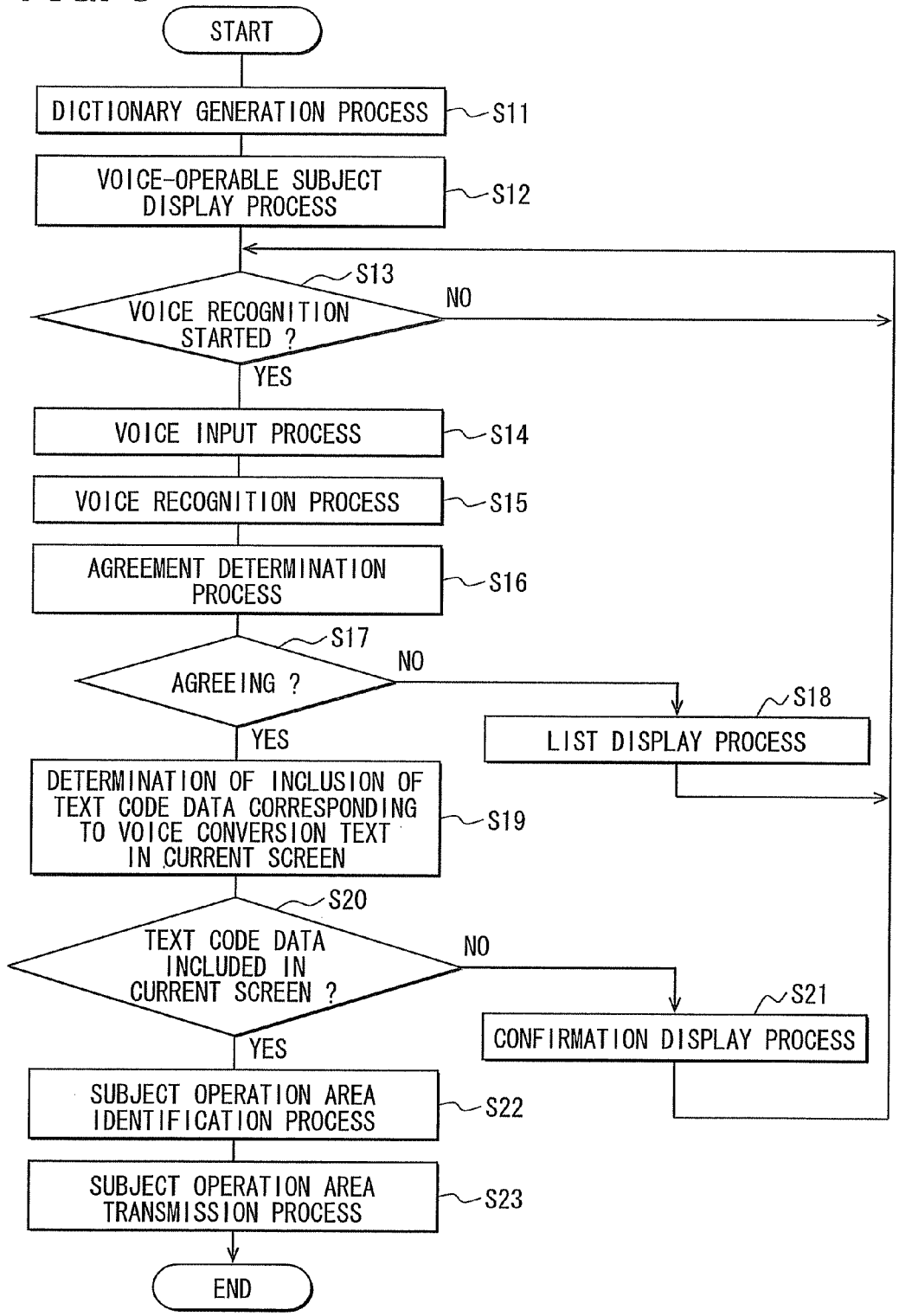
FIG. 5 is a flowchart of a voice operation process in the control unit of the present disclosure.

In step S23, the process performs a subject operation area transmission process. In the subject operation area transmission process, the process transmits, to the cellular phone 1, a signal indicating the subject operation area identified in step S22. When such signal showing the subject operation area is input to the main controller 16 of the cellular phone 1 through the cell-phone communication unit 11, it is determined, (i.e., interpreted), that an operation is performed on the button image of the subject operation area on the screen, which is currently displayed on the touch panel 14, and a process corresponding to the operated button is performed. Further, when such process generates new image data on the cellular phone 1 and the generated image data is transmitted to the in-vehicle apparatus 2, the process in the flowchart in FIG. 5 is repeated.

According to the above-described configuration, when the user would like to perform a process on the cellular phone 1, that is, a process indicated by the text code data in the screen of the in-vehicle apparatus 2 (e.g., a process for pressing a button or a switch including a text "BACK," a text "CLOSE," or a code "x"), which is generated according to the image data transmitted from the cellular phone 1, the desired area (i.e., the subject operation area) on the screen of the touch panel 14 of the cellular phone 1 is identified by simply uttering the voice command corresponding to the text code data of the intended process. In other words, the cellular phone 1 can be operated by the voice command received by the in-vehicle apparatus 2, since the signal identifying the subject operation area is transmitted to the cellular phone 1 based on the received voice command, thereby enabling an input (i.e., an operation) on the intended area of the screen of the cellular phone 1.

In summary, when the in-vehicle apparatus 2 displays a touch panel screen of the touch-panel-enabled cellular phone 1 that accepts an input operation from the touch panel 14, the user can control the cellular phone 1 based on the voice command accepted on the in-vehicle apparatus 2 side.

Further, in terms of a dictionary generation, a dictionary is generated based on the extraction of the text code data from the image data of the screen image that is received from the cellular phone 1 and the identification of the text/code display area of the extracted text code data. Therefore, even when a new application program is added to the cellular phone 1 and a new button having text code data for a process of such new application is displayed on the screen of the cellular phone 1, a new dictionary (i.e. a new text/code-and-area association) is always generated for the display of such new button. Further, information for operating the cellular phone 1 is generated and transmitted to the cellular phone 1 as a signal that indicates an area of the touch panel of the cellular phone 1 (i.e., the subject operation area), which corresponds to the text/code display area identified with reference to the dictionary associating the text code data with the command text converted from the voice command. Therefore, there is no need for the in-vehicle apparatus 2 to pre-store an operation command corresponding to the application of the cellular phone 1.

Thus, even when a new application is added to the cellular phone 1 requiring a new screen including the text code data for a process of the new application, such addition/change of the application of the cellular phone 1 is always readily accommodated for allowing the user to operate the cellular phone 1 based on the voice command received by the in-vehicle apparatus 2. In addition, without installing the cellphone side application in the in-vehicle apparatus 2, the cellphone side application is controllable from the in-vehicle apparatus 2, which is beneficial in terms of lightening the process load of the in-vehicle apparatus 2.

Further, in the above-mentioned configuration, the dictionary generation unit 31 refers to the association stored in the association storage unit 30, thereby acquiring the text indicating the contents of the extracted code and making the dictionary having the association between the code and its display area. In such manner, even when the user utters a voice command representing a code (e.g., a sign, a mark, an icon, a geometric figure or the like), such voice command representing a code is translated into an area including a position of the code in the screen image of the cellular phone 1 (i.e., the subject operation area), and such subject operation area can be transmitted as a signal to the cellular phone 1.

Further, in the above-mentioned configuration, if the text code data is not determined to be included in the screen image, a message is provided for the user, informing that a process indicated by the text code data cannot be performed in the currently displayed screen image. In such manner, when a process indicated by the voice-command-converted text code data cannot be readily performed, such situation can easily be recognized by the user.

Further, in the above-mentioned configuration, when the in-vehicle apparatus presents the message informing that the currently displayed screen is not capable of performing a process indicated by the text code data corresponding to the translated text, the in-vehicle apparatus may further present for the user a notice that prompts the user to switch the current screen. In such manner, the user is prompted by such notice to utter a voice command for switching the currently displayed screen, thereby being enabled to perform the intended process by the voice command and improving the user convenience.

Further, the text code data already stored as the association in the dictionary generated by the dictionary generation unit 31, such text code data is emphasized on the screen of the in-vehicle apparatus 2, thereby allowing an easy recognition of such text code data for the user.

Further, in the above-mentioned configuration, if the text code data corresponding to the voice conversion text is not found in the agreement determination process, the list of the text code data entries included in the associations in the dictionary generated by the dictionary generation unit 31 is displayed. Therefore, the text code data of a process that can be performed in the cellular phone 1 is provided for the user in an easily recognizable manner as a list, especially when the operation of the cellular phone 1 based on the voice command fails, because, for example, the mispronunciation of the voice command or the like, which does not allow the agreement determination process to find the corresponding text code data based on the voice conversion text.

Further, if the text code data corresponding to the voice conversion text is not found by the agreement determination process, the text code data included in the currently displayed screen may be provided as a list. In such manner, the text code data of a process that can be performed on the cellular phone 1 is displayed for the user in an easily recognizable manner, without switching the currently displayed screen. The list of the text code data included in the currently displayed screen is determined based on whether the voice conversion text is included in the text code data extracted by the most recent text code data extraction process.

In the above-mentioned embodiment, when the screen image has the multiple division areas in the in-vehicle generated image and the same button exists in more than one application division areas, a keyword indicative of a specific application is added to the text code data of such button for making a dictionary, so that the same buttons in more than one application division areas are distinguishable. However, such configuration may be changed or modified. For example, instead of adding the keyword indicating the corresponding application to the text code data regarding the button of the multiple application division areas, information indicative of correspondence to one of the multiple applications may be added to the text code data for generating a dictionary. More practically, when the text code data of a close button for closing the navigation division area and the text code data of a close button for closing the telephone division area may both be associated with the text code data "CLOSE" in the dictionary, and the text code data for the navigation division area may have the information indicative of the navigation application associated thereto, and the text code data for the telephone division area may have the information indicative of the telephone application associated thereto. In such manner, those two close buttons become distinguishable.

Further, when a voice conversion text provided by the voice recognition process agrees with the text code data of more than one button in the agreement determination process, that is, the same buttons in multiple application division areas, a query may be made to the user in regards to which one of the areas that has the button identified by the voice recognition process is intended to be executed by the user. For example, when the voice conversion text "close" is acquired by the voice recognition process and such text corresponds to the text code data "close" in both of the navigation division area and the telephone division area in the agreement determination process, a query "Which one of 'navi' or 'tel' would you like to close?" may be provided. Such query may be provided as a guidance voice from the in-vehicle voice output unit 36. Such query may also be provided as a display on the in-vehicle display 22. Therefore, the in-vehicle voice output unit 36 and the display control unit 28 is equivalent to a query unit in claims. In the present embodiment, the query is provided from the in-vehicle voice output unit 36.

Further, when a user utters a response indicating his/her intention in regards to the provided query, such response of analog voice signal may be picked up by the voice recognition unit 34 through the microphone 24 and the voice input unit 33, and the button of the intended application division area is determined by the subject operation area set unit 35. Further, though the input of the user response may be accepted by the operation input unit 23, the input of the user response is accepted by the microphone 24 in the present embodiment. Therefore, the operation input unit 23 and the microphone 24 is equivalent to a reception unit in claims.

The text code data determined to be corresponding to the button in one of the multiple division areas is examined by the subject operation area set unit 35, in terms of selection of one data from among the multiple text code data that are derived from the agreement determination process for determining the agreement of the data with the voice conversion text. Then, in the subject operation area identification process, the subject operation area set unit 35 refers to the dictionary stored in the dictionary storage unit 32, based on the selected text code data, to acquire an on-screen position corresponding to such data and identifies the subject operation area.

For example, when the user has provided a response "navi" in response to the query "Which one of 'navi' or 'tel' would you like to close?," it is determined that the user intends to operate the button in the navigation division area. Then, from among the text code data "close" for the navigation division area and the text code data "close" for the telephone division area, the text code data "close" for the navigation division area is selected. Then, the display area corresponding to the text code data "close" for the navigation division area is acquired in the subject operation area identification process, and such area is identified as the subject operation area.

In the above-mentioned embodiment, the display area associated with the text code data that entirely matches with the voice conversion text is acquired, and the subject operation area is identified as corresponding area to such display area. However such configuration may be changed or modified. For example, by providing the user with selection candidates, in which the text code data representing a text at least partially matches with voice conversion text (i.e., one or more characters but not all characters in the text of text code data is matching with the voice conversion text) and having the user selection of the text code data, such text code data is used to acquire the display area, and the display area is identified as the subject operation area. Such operation scheme is described in the following.

At first, the subject operation area set unit 35 acquires the text code data that at least has one matching character in the text derived from the voice conversion text from the dictionary storage unit 32, and the display control unit 28 displays on the in-vehicle display 22 a selection screen for allowing the user to select one of selection candidates of the text code data, after making such selection candidates based on the text code data acquired by the subject operation area set unit 35. The selection of such candidates may be performed by using a steering switch on a steering wheel. Therefore, the operation input unit 23 is equivalent to an input unit in claims. Then, upon having the user selection of one of the selection candidates from the steering switch, the selected text code data is associated with the display area by the subject operation area set unit 35, and the subject operation area corresponding to the display area is identified.

The matching of the text code data and the voice conversion text at least partially may mean the entire matching of all arrangement of characters in the text indicating the same sound, corresponding to the multiple entries of the code text data, or may be partial agreement/matching, having a certain threshold of matching ratio in terms of the number of matching characters, corresponding to multiple entries of the text code data.

Further, the matching of the text code data and the voice conversion text may be the similarity of the text equal to or above a certain similarity threshold. For example, when the voice conversion text is "facility," a text code data "nearby facility" may be picked up from the text code data in the dictionary storage unit 32. Furthermore, the matching may also be determined based on the matching of the contents of the voice conversion text and text code data. For example, when the voice conversion text is "CD," the text code data such as the "music" or "AUDIO" may be picked.

In other words, the correspondence between a text having a certain meaning/contents and the other text having a similar meaning/contents may be stored in the association storage unit 30 in advance as similar text associations, and the subject operation area set unit 35 may determine, with reference to such similar text associations, the text code data having the similar meaning/contents based on the text recognized by the voice recognition unit 34 with its display area, thereby identifying an area on the screen of the touch panel 14 as the subject operation area corresponding to such display area.

Therefore, by preparing, on the in-vehicle apparatus 2 side, a dictionary that allows selection of similar text code data, the convenience (i.e., voice recognition rate) of the voice recognition process is improved, thereby preventing the voice recognition failure due to the un-matching of the voice-recognized text with the text code data at a time of screen design/layout change on the cellular phone 1 side.

Furthermore, the first alphabet character of the voice-recognized text may be used to pick up multiple entries of the matching text code data from the dictionary storage unit 32 by the subject operation area set unit 35, similarly to a selection of a destination entry from the database of the navigation apparatus, and selection candidates picked up in such manner may be displayed on the selection screen of the in-vehicle display 22 by the display control unit 28, for allowing the user selection.

In such configuration, the user-intended text code data and its associated display area can be picked up even when there are multiple entries of the text code data having the same sound or even when the translation from the voice command to the voice conversion text has some text conversion error.

Further, in the above embodiment, when the input from the touch panel is disabled, a process of the flowchart in FIG. 5 is started after receiving an input of the cell-phone origin image data and generating the in-vehicle generated image by the display control unit 28. However, such configuration may be changed or modified. For example, when the input from the touch panel is enabled, the process of FIG. 5 may be configured to start after receiving an input of the cell-phone origin image data and generating the in-vehicle generated image by the display control unit 28.

Further, in the above embodiment, every time new image data is generated by the cellular phone 1 and such image data is transmitted to the in-vehicle apparatus 2, a new dictionary for the voice recognition process is generated by the process of FIG. 4. However, such configuration may be changed or modified. For example, existing text code data extraction results (i.e., an existing dictionary) may be utilized for decreasing the process load for extracting the text code data. That is, in other words, when little or no change exists in the screen data that is transmitted from the cellular phone 1 to the in-vehicle apparatus 2, the existing text code data extraction results may be utilized.

More practically, the change of pixel values between a pre-switching screen and a post-switching screen is equal to or below a certain threshold (including no change), the screen change is determined as below threshold by the display control unit 28, and no text code data extraction is performed from the new image data, utilizing the existing text code data extraction results.

That is, every time when the new image data from the cellular phone 1 is received by the in-vehicle communication unit 21 and the screen is switched to the newly received data, the amount of change between the pre-switching screen and the post-switching screen is determined by the control unit 27 relative to a predetermined threshold value. Then, if the amount of change is not under the threshold, the text code data is extracted from the newly received image data by the text code recognition unit 29, for identifying the display area of the extracted text code data on the screen and for adding the association between the newly extracted text code data and the information of the display area regarding the newly extracted text code data to the dictionary. On the other hand, if the amount of change is under the threshold, such text code data extraction from the image data of the post-switching screen may not be performed. In such manner, the useless/unnecessary text code data extraction from the screen image data is prevented, in comparison to the operation scheme of performing the dictionary generation process every time the image data is transmitted to the in-vehicle apparatus 2.

Further, the existing text code data extraction results may be stored in a memory, such as the RAM of the control unit 27, in a form that associates the characteristics of the screen (i.e., a title text and/or button names in a specific division area or the like) with the extracted text and the information of its display area. Such information associating the screen characteristics with the extracted text and its display area (i.e., an on-screen text position) is designated as text recognition template hereinafter. Besides, at a timing just after the switching of the screen, such text recognition template stored in a memory is utilized as the temporary text code data extraction results for the comparison with the results of the voice recognition.

Then, at the time of completion of text code data extraction of all the texts from the post-switching screen, such extraction result is examined if the extraction result is different from the existing text recognition template. If the extraction result is different from the existing text recognition template, the existing text recognition template is re-written to learn such a difference. Therefore, in the terminal mode, even if the display unit of the in-vehicle apparatus 2 has only a minimum calculation capacity for a display process of the cell-phone side screen, the text code data extraction process for extracting the text code data is performed at high speed due to the reduction of the process load. Further, the required time from the switching of the screen to the start of the voice recognition is reduced.

Further, in case of drastic screen change at the time of screen switching, that is, when the post-switching screen has an entirely different screen layout or the like and stored text recognition templates do not include the text code data corresponding to the voice-recognized text, the following scheme may be adopted. More practically, in such case, after waiting for the completion of the text code data extraction from the post-switching screen and updating of the dictionary based on such extracted text code data, the text code data corresponding to the voice-recognized text may be acquired with reference to the updated dictionary.

Further, in the above-mentioned embodiment, the voice command is converted to a text, and the operation area on the screen corresponding to the converted text is identified for sending an operation area identification signal from the in-vehicle apparatus 2 to the cellular phone 1, and for realizing the operation equivalent to a touch on the screen of the cellular phone. However, such configuration may be changed. For example, a display form on the screen may be processed by the voice command. In other words, when the voice command indicates a traffic sign such as a right/left turn, a traffic signal and the like, a portion of the screen corresponding to such sign/signal may be expanded, and when a button on the screen such as a call button or a volume up/down button is indicated by the voice command, a portion of the screen having such button is expanded. That is, when the display area corresponding to the text code data is acquired by the subject operation area set unit 35, the acquired area may be expanded.

In such configuration, without requiring the specification change on the cellular phone 1 side, that is, with the change only on the in-vehicle apparatus 2 side, the display form of the screen presented for the user has an easily recognizable and operable form, which is especially advantageous when the user is not allowed to closely watch/gaze the screen during the travel of the vehicle or the like. Further, such change of the display form of the screen and the touch operation on the screen may be simultaneously performed. For example, when the voice command instructing "volume up" is uttered by the user, a touch operation for increasing the sound volume by a predetermined step, together with the expansion of the volume button, may be performed.

Further, in the above-mentioned embodiment, the dictionary generation unit 31 generates in advance a dictionary associating the text code data extracted from the in-vehicle generated image with the information of its display area (i.e., the text/code-and-area association) and identifies the operation position of the voice command with reference to such dictionary upon receiving the voice command. However, such configuration may be changed. For example, when a voice command is provided, the text code data corresponding to the voice command may be searched for and extracted from among the text code data in the in-vehicle generated image, and the display area of the extracted text code data may be identified to output such area to the cellular phone 1.

When a voice command "close audio screen" is provided, the text code data corresponding to the text "close" and "audio" are identified together with its display area. In such case, if the multiple display areas corresponding to the text "close" exist, one of the multiple areas close to the display area of the text "audio" may be used. Alternatively, the display area may be determined according to the query made to the user about the intended application division area or the like. In such manner, if the control unit 27 in the in-vehicle apparatus 2 has a high performance for identifying the operation area in real time upon receiving the voice command, a real-time text code data extraction scheme without in-advance dictionary generation may be adopted, thereby increasing the user convenience by performing the text extraction on-demand only when the voice command is uttered.

Further, in the above-mentioned embodiment, the voice recognition and other processes are performed in the control unit 27 of the in-vehicle apparatus 2. However, such configuration may be changed. For example, by having a component equivalent to the voice recognition unit 34 in an external server or the like and by sending to such external server a voice recognition request from the in-vehicle apparatus 2 through the cellular phone 1, the results of the voice recognition may be received from the external server. Such configuration is described with reference to FIG. 9.

Figure 9:
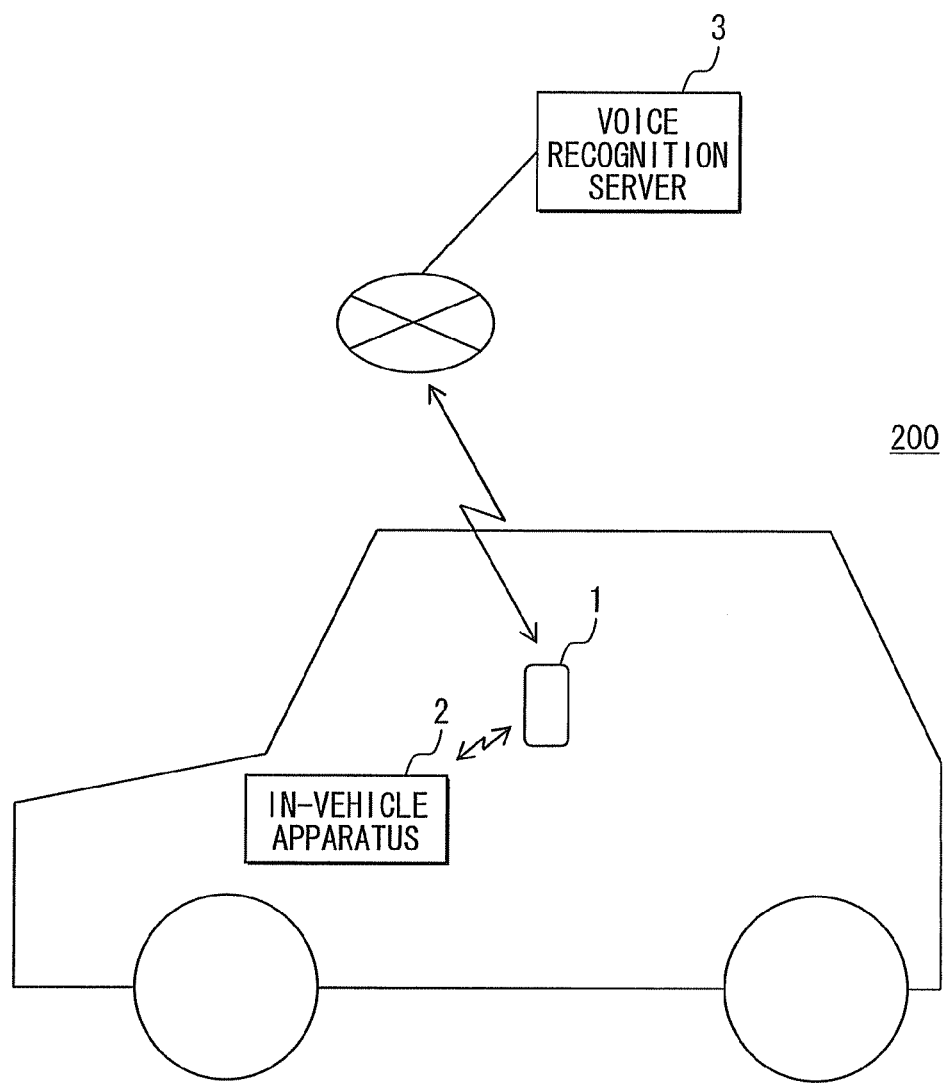
FIG. 9 is a block diagram of an information display system in a second embodiment of the present disclosure.

FIG. 9 is a block diagram of configuration of an information display system 200. In FIG. 9, like parts have like numbers as the above embodiment, and description of such parts are omitted.

The information display system 200 includes the cellular phone 1, the in-vehicle apparatus 2, and voice recognition server 3, as shown in FIG. 9. The voice recognition server 3 includes a communication unit for communication with the in-vehicle apparatus 2 through the cellular phone 1 by way of communication networks such as a telephone network, an Internet and the like, together with a dictionary memory unit for storing a voice recognition dictionary and a control unit for controlling various processes such as a communication process, a voice recognition process and the like.

The control unit 27 of the in-vehicle apparatus 2 transmits a digital voice signal to the voice recognition server 3 from the in-vehicle communication unit 21 through the cellular phone 1, when an analog voice signal accepted by the above-mentioned voice input process is converted to the digital voice signal. The cellular phone 1 transmits the digital voice signal received from the in-vehicle apparatus 2 by the cell-phone communication unit 11 to the voice recognition server 3 from a server communication unit, which is not illustrated.

The voice recognition server 3 which receives the digital voice signal performs a process similar to the above-described voice recognition process, and converts the digital voice signal to a text. Then, the converted text is transmitted to the in-vehicle apparatus 2 through the cellular phone 1. In the in-vehicle apparatus 2, after receiving voice-recognized text from the voice recognition server 3 through the cellular phone 1 by the in-vehicle communication unit 21, a process corresponding to step S16 of FIG. 5 and thereafter is performed. The in-vehicle communication unit 21 is equivalent to a voice recognition server communication unit in claims.

In such manner, in the terminal mode, even if the in-vehicle apparatus 2 has only a minimum calculation capacity for a display process of the cell-phone side screen, the voice recognition process is performed with a minimum load of the in-vehicle apparatus 2.

Further, various kinds of change is considered to be within the scope of the invention, thereby also allowing combination of such changes in different embodiments without departure from the spirit of the invention as defined by appended claims.

What is claimed is:

1. An in-vehicle apparatus receiving image data representative of a screen image from a portable terminal having a touch panel, and the apparatus displaying the screen image of the touch panel of the portable terminal based on the image data, the apparatus comprising:
    a vehicle communication unit receiving the image data from the portable terminal;
    an extraction unit extracting a text code data from the image data received by the vehicle communication unit, the image data having the text code data that represents at least one of a text and a code in the screen image of the touch panel of the portable terminal;
    a text-code display area identification unit identifying a text-code display area in the screen image;
    a voice recognition unit recognizing a user-uttered voice command and converting a recognized voice command into a command text; and
    a subject operation area set unit identifying a text-code display area as a subject operation area in the screen image of the portable terminal, wherein
    when the voice recognition unit acquires the command text, a determined text code data of the command text is determined based on the command text acquired from the voice recognition unit, the text code data extracted by the extraction unit, and information corresponding to the text code data on the text-code display area,
    the text-code display area is acquired based on the determined text code data,
    the subject operation area is identified as an area of the screen image of the touch panel corresponding to the text-code display area acquired by the subject operation area set unit, and
    a signal indicative of the subject operation area identified by the subject operation area set unit is transmitted to the portable terminal by the vehicle communication unit.

2. The in-vehicle apparatus of claim 1 further comprising:
    an association generation unit generating a text-code-and-area association between the text code data and the text-code display area based on the information of the text code data from the extraction unit and the text-code display area identified by the text-code display area identification unit, wherein
    the subject operation area set unit identifies the text code data corresponding to the command text with reference to the text-code-and-area association and the text-code display area of the identified text code data.

3. The in-vehicle apparatus of claim 1, further comprising:
    an in-vehicle touch panel displaying the screen image of the portable terminal based on the image data received by the vehicle communication unit, and the in-vehicle touch panel being operational, wherein
    when the in-vehicle touch panel receives an operation, an operation area of the in-vehicle touch panel is determined in the screen image,
    an area of the touch panel of the portable terminal corresponding to the operation area of the in-vehicle touch panel is identified as the subject operation area, and
    a signal indicative of the subject operation area is transmitted from the vehicle communication unit to the portable terminal.

4. The in-vehicle apparatus of claim 1 further comprising:
    an association storage unit storing a predetermined association between a code and a text indicating contents of the code, wherein
    based on the association stored in the association storage unit, when the text code data extracted by the extraction unit is a code, the association generation unit generates the text-code-and-area association between the text code data and the text-code display area by using the text code data of the text indicating the contents of the code.

5. The in-vehicle apparatus of claim 1 wherein,
    the extraction unit extracts the text code data from the image data received by the vehicle communication unit each time the vehicle communication unit receives new image data and the screen image is displayed,
    the text-code display area identification unit identifies the text-code display area each time the text code data is extracted,
    newly-extracted text code data and newly-identified text-code display area are associated to define a new association, and
    the new association is appended to the existing text-code-and-area association.

6. The in-vehicle apparatus of claim 5 further comprising:
a presentation unit displaying the screen image of the portable terminal based on the image data received by the vehicle communication unit, wherein
when the voice recognition unit acquires a text, the subject operation area set unit acquires the text code data corresponding to the text, and determines if the text code data is included in the screen image currently being displayed,
when the text code data is included in the screen image, the subject operation area set unit identifies the text-code display area corresponding to the text code data, and identifies a corresponding area on the screen image of the touch panel of the portable terminal as the subject operation area, and
when the text code data is not determined to be included in the screen image currently being displayed, the presentation unit provides a message that a process indicated by the text code data cannot be performed in the screen image currently being displayed.

7. The in-vehicle apparatus of claim 6, wherein when the subject operation area set unit determines that the text code data corresponding to the text acquired by the voice recognition unit is not included in the screen image, the presentation unit further displays a notice requesting to switch the currently displayed screen.

8. The in-vehicle apparatus of claim 1, wherein the subject operation area set unit identifies the subject operation area in the screen image of the touch panel of the portable terminal by acquiring the text-code display area corresponding to the text code data that is an exact match with the command text recognized by the voice recognition unit and by mapping the text-code display area acquired to an area in the screen image of the touch panel of the portable terminal.

9. The in-vehicle apparatus of claim 1 further comprising:
an input unit receiving an input, wherein
the subject operation area set unit identifies the subject operation area in the screen image of the touch panel of the portable terminal by determining a partial match of at least one character in the command text with the text code data in the text-code-and-area association for establishing partial match text code data entries, and by receiving a selected text code data inputted from the input, wherein the selected text code data is one of a partial match text code data from the partial match text code data entries.

10. The in-vehicle apparatus of claim 1 further comprising:
a presentation unit displaying the screen image of the touch panel to the user, wherein the text code data included in the text-code-and-area association generated by the association generation unit is emphasized in the screen image displayed on the presentation unit.

11. The in-vehicle apparatus of claim 1 further comprising:
a list unit generating a list of the text code data included in text-code-and-area association generated by the association generation unit, wherein
when the text code data of the command text corresponding to the text-code display area is not identified by the subject operation area set unit, the text code data in the text-code-and-area association generated by the association generation unit is shown in a list generated by the list unit.

12. The in-vehicle apparatus of claim 1, wherein when the screen image includes multiple division areas and a subject text code data exists in more than one of the multiple division areas, the association generation unit generates the text-code-and-area association with a division attribute text added to the association, in which one of multiple division areas of the screen image having a subject text code data is specified.

13. The in-vehicle apparatus of claim 1 further comprising:
a display unit displaying the position of text code data provided in the multiple division areas of the screen image of the touch panel of the portable device, the display unit further receiving an input in regards to the text code data in the multiple division areas, wherein
when the text code data corresponding to the command text is provided in more than one of the multiple division areas, the subject operation area set unit determines the text code data according to the input received by the display unit.

14. An information display system, comprising:
a portable terminal including
a touch panel receiving an input from a user,
a terminal communication unit communicating with other devices, and
a display unit displaying a screen image according to an image data, the image data having a text code data that represents at least one of a text and a code in the screen image of the touch panel; and
an in-vehicle apparatus including
a vehicle communication unit communicating with the terminal communication unit of the portable terminal, wherein the vehicle communication unit receives the image data from the portable terminal via the terminal communication unit,
an extraction unit extracting the text code data from the image data received by the vehicle communication unit,
a text-code display area identification unit identifying a text-code display area in the screen image,
a voice recognition unit recognizing a user-uttered voice command and converts a recognized voice command into a command text, and
a subject operation area set unit identifying a text-code display area as a subject operation area in the screen image of the portable terminal,
wherein when the voice recognition unit acquires the command text, a determined text code data of the command text is determined based on the command text acquired from the voice recognition unit, the text code data extracted by the extraction unit, and information corresponding to the text code data on the text-code display area,
the text-code display area is acquired based on the determined text code data,
an area of the screen image of the touch panel corresponding to the text-code display area acquired by the subject operation area set unit is identified as the subject operation area, and
a signal indicative of the subject operation area identified by the subject operation area set unit is transmitted to the portable terminal by the vehicle communication unit,
wherein when the portable terminal receives the signal indicative of the subject operation area from the in-vehicle apparatus, the signal is treated in a manner similar to an input operation of the identified subject operation area of the touch panel of the portable terminal.

15. An information display system comprising:
a voice recognition server recognizing a user-uttered voice command;
a portable terminal including a touch panel to receive an input and a display unit to display a screen image according to an image data; and an in-vehicle apparatus including a display unit to display an image, wherein the in-vehicle apparatus receives an image data from a portable terminal having a touch panel and displays a screen image of the touch panel based on the image data received, the in-vehicle apparatus further including a vehicle communication unit receiving the image data of the screen image of the portable terminal, an extraction unit extracting text code data from the image data received by the vehicle communication unit, the image data includes the text code data that represents at least one of a text and a code in the screen image of the touch panel of the portable terminal, a text-code display area identification unit identifying a text-code display area in the screen image, a voice recognition server communication unit transmitting a user-uttered voice command to the voice recognition server and receives a command text from the voice recognition server based on the user-uttered voice command, and a subject operation area set unit identifying a text-code display area as a subject operation area in the screen image of the portable terminal, wherein, when the command text is acquired from the voice recognition server communication unit, a determined text code data of the command text is determined based on the command text acquired, the text code data extracted by the extraction unit, and information corresponding to the text code data on the text-code display area, and the determined text code data and the text-code display area is acquired based on the determined text code data, and an area of the screen image of the touch panel of the portable terminal corresponding to the text-code display area is determined as the subject operation area, and a signal indicative of the subject operation area identified by the subject operation area set unit is transmitted to the portable terminal by the vehicle communication unit.

* * * * *